(12) United States Patent
Shiraishi et al.

(10) Patent No.: US 6,880,518 B2
(45) Date of Patent: Apr. 19, 2005

(54) METHOD OF CONTROLLING DIRECT GASOLINE INJECTION TYPE INTERNAL COMBUSTION ENGINE WITH TURBOCHARGER AND DIRECT GASOLINE INJECTION TYPE INTERNAL COMBUSTION ENGINE WITH TURBOCHARGER

(75) Inventors: Takuya Shiraishi, Hitachinaka (JP); Shirou Yamaoka, Hitachi (JP); Noboru Tokuyasu, Hitachi (JP); Minoru Ohsuga, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 67 days.

(21) Appl. No.: 10/246,478

(22) Filed: Sep. 19, 2002

(65) Prior Publication Data

US 2003/0217733 A1 Nov. 27, 2003

(30) Foreign Application Priority Data

May 22, 2002 (JP) .......................................... 2002-147067

(51) Int. Cl.[7] .............................................. F02B 17/00
(52) U.S. Cl. ........................ 123/295; 123/305; 123/435; 60/274
(58) Field of Search ................................ 123/295, 305, 123/435; 60/274, 285, 300

(56) References Cited

U.S. PATENT DOCUMENTS 6,658,840 B1 * 12/2003 Iiyama et al. .................. 60/285

FOREIGN PATENT DOCUMENTS

| JP | 11-336600 | 12/1999 |
| JP | 2000-248978 | 9/2000 |
| JP | 2000-310120 | 11/2000 |
| JP | 2001-003800 | 1/2001 |

* cited by examiner

Primary Examiner—John T. Kwon
(74) Attorney, Agent, or Firm—Crowell & Moring LLP

(57) ABSTRACT

A first object of the invention is to reduce an exhaust gas in a lean burn area which is expanded by a supercharging, in a direct gasoline injection type internal combustion engine provided with a turbocharger. A second object of the invention is to prevent a knocking and a misfire at a time of self ignition combustion. The invention is used for the direct gasoline injection type internal combustion engine provided with the turbocharger. In order to achieve the first object, a combustion mode is switched from a stratified combustion mode to a self ignition combustion mode at a time when a suction pressure of the engine is equal to or more than an atmospheric pressure. Further, in order to achieve the second object, an ignition timing is set to a range between a top dead center and 10 degrees after the top dead center (0 to 10 (ATDC)) at a time of operating an engine in accordance with a self ignition combustion mode.

8 Claims, 6 Drawing Sheets

METHOD OF CONTROLLING DIRECT GASOLINE INJECTION TYPE INTERNAL COMBUSTION ENGINE WITH TURBOCHARGER AND DIRECT GASOLINE INJECTION TYPE INTERNAL COMBUSTION ENGINE WITH TURBOCHARGER

BACKGROUND OF THE INVENTION

1. Field of the Invention

The present invention relates to a method of controlling a direct gasoline injection type internal combustion engine with a turbocharger, and more particularly to a control method for improving a combustion at a time of being operated under a high load, purifying an exhaust gas and improving a specific fuel consumption.

2. Description of the Related Art

In a lean burn engine as typified by a direct gasoline injection engine, for the purpose of improving a specific fuel consumption, in an operation area having a low engine torque, an internal combustion engine is operated under a state in which an air is excess in comparison with a theoretical air fuel ratio, that is, under a so-called lean burn state. In the case that the lean burn is executed, an air amount which is defined by a fuel amount for achieving a torque required by a driver and a predetermined air fuel ratio is limited by an air volume displacement of the engine. Accordingly, a range in which the engine can be operated on the basis of the lean burn which is advantageous in view of improving the specific fuel consumption is limited to the range in which the engine torque is low. It is possible to expand the lean burn area by making the air fuel ratio small, however, since a fuel injection amount is also increased, an air-fuel mixture around an ignition plug becomes too rich. Accordingly, there is a problem that an incomplete combustion is generated and a smoke is generated.

On the contrary, in JP-A-2000-248978, there is described a technique that an operable area in the lean burn is expanded by increasing the air amount. In the publication mentioned above, there is disclosed a technique that an amount of oxygen corresponding to an increase of the fuel injection amount is secured by executing a supercharging, and the air-fuel mixture having a suitable air fuel ratio can be formed around the ignition plug, thereby preventing the smoke from being generated due to the incomplete combustion.

In accordance with the technique described in the prior art mentioned above, the lean burn area can be expanded while inhibiting the smoke discharge, however, there is listed up a new problem that an NOx discharge amount is increased in proportion to the increased air amount. The lean burn engine such as the direct gasoline injection engine or the like is provided with an NOx catalyst which temporarily adsorbs the NOx in the exhaust gas so as to accumulate at a fixed amount, and thereafter purifies the NOx in accordance with an operation of a reducing agent such as CO, HC component or the like. In order to purify the NOx accumulated in the NOx catalyst, a rich spike control which temporarily makes the air fuel ratio rich and supplies the fuel (CO or HC component) not contributing to the combustion to the catalyst is executed at every fixed intervals. Since the rich spike control additionally injects the fuel which does not contribute to the combustion, the specific fuel consumption is deteriorated. Accordingly, it is possible to improve the specific fuel consumption by expanding the lean burn area in accordance with the supercharging, however, there is generated a problem that the specific fuel consumption is deteriorated by the increase of the number of rich spike control and the fuel injection amount which are caused by the increase of NOx discharge amount.

On the contrary, in recent years, there is proposed a compression ignition engine which ignites and burns a gasoline air-fuel mixture on the basis of a compression motion of a piston without using the ignition plug. The compression ignition engine has a potential capable of reducing an NOx discharge concentration to $1/10$ or less in comparison with the conventional gasoline engine which executes the ignition and the combustion by using the ignition plug. Accordingly, since the NOx catalyst is not required, it is possible to simplify an exhaust system, and it is also possible to remove the fuel deterioration element such as the rich spike control. However, since this engine does not have any ignition source, it is hard to control the ignition and the combustion in a wide operation area of the engine, and the technique has not been established yet. Further, since the operation area on the basis of the compression ignition is limited to a very narrow range having a low speed and a low load, a lot of efforts for expanding the area have been executed.

For example, in JP-A-2000-310120, there is disclosed a technique of changing the number of combustion during a cycle in correspondence to the load such as one combustion per four stroke or one combustion per two stroke, at a time of judging a self ignition combustion so as to expand the operation area. Further, in JP-A-2001-3800, there is disclosed a method of controlling an ignition timing by using a plurality of fuel injections as a trigger for ignition. However, none of the techniques are sufficient for the engine employed in a motor vehicle.

Accordingly, it is possible to expand the operable range on the basis of the lean burn which is advantageous in view of improving the specific fuel consumption in the direct gasoline injection engine, however, since the rich spike control is required in view of the structure of the exhaust system provided with the NOx catalyst, there is a problem that the specific fuel consumption is not improved in an actual traveling condition. Further, in the compression ignition engine which can construct the exhaust system requiring no NOx catalyst, there has not been established a technique which can achieve the low NOx combustion in a wide operation range. Accordingly, none of the techniques are sufficient in view of the engine system which can achieve both of the improvement of specific fuel consumption and the reduction of exhaust gas.

SUMMARY OF THE INVENTION

The present invention is made by taking the matters mentioned above into consideration, and a first object of the present invention is to reduce an exhaust gas in a lean burn area which is expanded by a supercharging, in a direct gasoline injection engine provided with a turbocharger. A second object of the present invention is to prevent a knocking and a misfire at a time of self ignition combustion.

The first object mentioned above can be basically achieved by setting a combustion mode to a stratified combustion mode at a time when a suction pressure of an engine is equal to or less than an atmospheric pressure and switching the combustion mode to a self ignition combustion mode at a time when the suction pressure of the engine is equal to or more than the atmospheric pressure, in a direct gasoline injection type internal combustion engine provided with a turbocharger.

In particular, the first object can be achieved by a method of controlling a direct gasoline injection engine, the direct gasoline injection engine comprising:

a fuel injection valve which is capable of directly injecting a fuel into a combustion chamber of the engine;

an intake valve and an exhaust valve which are combined with the combustion chamber of the engine;

a variable valve mechanism which makes a phase of the intake valve or the exhaust valve variable;

a turbine which is placed in an exhaust passage of the engine and is turned by an exhaust gas;

a compressor which is placed in an intake passage of the engine and is turned by a rotary force of the turbine;

a catalyst which is disposed in a downstream side of the turbine;

a bypass passage which bypasses the turbine; and a control valve which is capable of adjusting an exhaust gas flow amount to the bypass passage, wherein a combustion mode is switched from a stratified combustion to a self ignition combustion at a time when a suction pressure of the engine is equal to or more than an atmospheric pressure.

Further, the second object can be basically achieved by setting an ignition timing to a range between a top dead center and 10 degrees after the top dead center (0 to 10 (ATDC)) at a time of operating an engine in accordance with a self ignition combustion mode, in a direct gasoline injection type internal combustion engine provided with a turbocharger in which a combustion mode is switched to a stratified combustion mode or a self ignition combustion mode in correspondence to a suction pressure of the engine.

In particular, the second object can be achieved by a method of controlling a direct gasoline injection engine, the direct gasoline injection engine comprising:

a fuel injection valve which is capable of directly injecting a fuel into a combustion chamber of the engine;

an intake valve and an exhaust valve which are combined with the combustion chamber of the engine;

a variable valve mechanism which makes a phase of the intake valve or the exhaust valve variable;

a turbine which is placed in an exhaust passage of the engine and is turned by an exhaust gas;

a compressor which is placed in an intake passage of the engine and is turned by a rotary force of the turbine;

a catalyst which is disposed in a downstream side of the turbine;

a bypass passage which bypasses the turbine; and a control valve which is capable of adjusting an exhaust gas flow amount to the bypass passage, wherein an ignition timing is set to a predetermined value after a top dead center at a time of operating the engine in accordance with a self ignition combustion mode.

Further, in order to achieve the method mentioned above, it is necessary to provide an internal combustion engine comprising:

a fuel injection valve which directly supplies a fuel into a combustion chamber of the engine;

an ignition plug which supplies an ignition spark within the combustion chamber;

a turbine which is provided in an exhaust passage of the engine;

a supercharger which is driven by the turbine and compresses an air passing through an intake passage; and a control apparatus which switches a combustion mode from a plug ignition to a self ignition in correspondence to an operation state of the engine.

Other objects, features and advantages of the invention will become apparent from the following description of the embodiments of the invention taken in conjunction with the accompanying drawings.

DESCRIPTION OF THE PREFERRED EMBODIMENT

A description will be given of an embodiment which is obtained by embodying the present invention into a gasoline engine system for a motor vehicle, with reference to the accompanying drawings.

Figure 1:
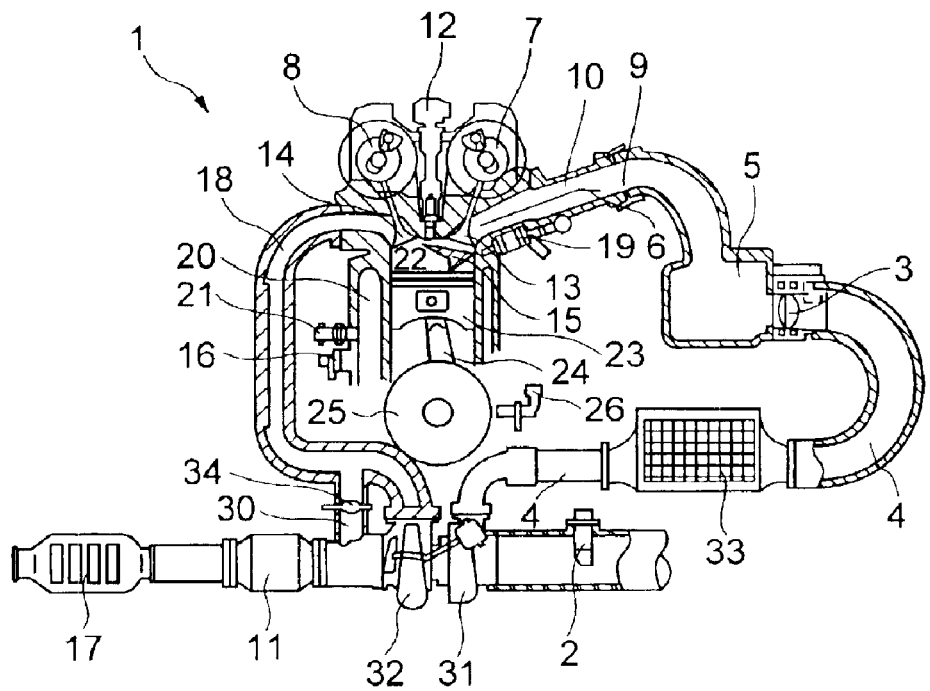
FIG. 1 is a schematic view which shows an entire structure of an internal combustion engine in accordance with an embodiment.

A gasoline engine system 1 shown in FIG. 1 is provided with an intake system which introduces an air to an engine, an exhaust system which discharges a combustion gas output from the engine, and a turbocharger which is placed within pipes of the intake system and the exhaust system.

The intake system is provided with an air amount sensor 2 which measures an amount of air introduced from an air cleaner (not shown), a compressor 31 which supercharges the introduced air, an intake passage 4 which connects the compressor 31 to a throttle valve 3, an intake manifold 9 which distributes the air passing through the throttle valve 3 into respective cylinders, and a surge tank 5 which is provided between the intake manifold 9 and the throttle valve 3 for inhibiting an intake air pulsation. Since the intake air which is supercharged by the compressor 31 is increased in temperature, the structure is frequently made such that an inter cooler 33 is generally placed in the middle of the intake passage 4 so as to reduce a temperature of the intake air.

An engine is of a direct gasoline injection type, and is provided with a fuel injection valve 19 for directly injecting a fuel 15 into a combustion chamber 22, a piston 23, an intake valve 13, an exhaust valve 14, an ignition plug 12, a changeable mechanism 8 for the exhaust valve, a water temperature sensor 21, a knocking sensor 16, a crank mechanism 24, and crank angle sensors 25 and 26. Further, the engine is provided with a control valve 6 for generating an air flow within the combustion chamber 22 and a rectifying plate 10 in a connection portion to the intake system.

The exhaust system is provided with a turbine 32 which is connected to an exhaust passage 18 from the engine, a catalyst 11 which is disposed in a downstream side thereof and comparatively close to the engine, and a catalyst 17 which is disposed near an under floor of a vehicle. The catalyst 11 is generally constituted by a three way catalyst which can simultaneously purify HC, CO and NOx, and the catalyst 17 is generally constituted by an NOx catalyst which temporarily adsorbs NOx under a lean ambient atmosphere and purifies on the basis of a rich spike control at every fixed intervals. Further, there are provided with a pipe 30 which is disposed in the middle of the exhaust passage 18 and bypasses from an upstream side of the turbine 32 to a downstream side thereof, and a control valve 34 which can change a flow passage area of the bypass passage 30.

An engine operation is in summary performed as follows. A volumetric capacity of the combustion chamber 22 is changed in accordance with an operation of the piston 23 which is connected to the crank mechanism 24 of the engine. A gas after combustion is discharged in accordance with a vertical motion of the piston 23, and a fresh air is sucked into the engine. The sucked air is controlled in a suction amount by the throttle valve 3 which is arranged in the intake passage 4. The throttle valve 3 may be constituted by an electronic control throttle valve which converts a change amount of an accelerator pedal into an electric signal so as to drive by a motor. An amount of air which is sucked into the engine is measured by the air amount sensor 2 which is provided in an upstream side of the throttle valve. The sucked air is filled into the surge tank 5. The surge tank 5 has an effect of inhibiting a pressure fluctuation within the intake manifold 9. There is a case that an external EGR passage (not shown) is connected to the collector 5. The suction air is sucked within the combustion chamber 22 on the basis of a motion of the air flow control valve 6 while generating the air flow.

The fuel is supplied to the fuel injection valve 19 by a fuel pump (not shown) after a fuel pressure thereof is increased to a preset value. In an amount of fuel which is injected from the fuel injection valve 19, an injection pulse width is computed so as to become a preset air-fuel ratio within a control unit (not shown) on the basis of a value which is measured by the air amount sensor 2. The fuel injection valve 19 injects the fuel in accordance with an injection signal output from the control unit. A rotation number of the engine can be measured, for example, by using output signals of a crank angle sensor 25 mounted to a crank mechanism 24 and a magnetic pickup 26.

The exhaust gas discharged from the combustion chamber 22 is introduced within the turbine 32 which is placed in the middle of the exhaust passage 18, is converted a high temperature energy into a rotation work of the turbine, and is discharged. The compressor 31 which is coaxially connected with the turbine increases the rotation number on the basis of the energy received by the turbine 32, and supercharges the newly introduced air so as to feed into the engine. The exhaust gas discharged from the turbine 32 passes through the catalyst 11 which is mounted to the exhaust system, and a harmful component (for example, HC, NOx and CO) in the exhaust gas is removed at that time. Further, in the case of a lean burn, since it is impossible to purify the NOx component by the catalyst 11 due to a lean ambient atmosphere in which a lot of oxygen exists in the exhaust gas, the NOx is temporarily adsorbed by the catalyst 17, the rich spike control is executed at every fixed intervals, and the accumulated NOx is reduced and discharged. The structure may be made such that an air-fuel ratio sensor, an exhaust gas temperature sensor and an oxygen sensor which are not illustrated are mounted in front and rear sides of the catalysts 11 and 17, thereby sensing various kinds of information concerning the exhaust gas and reflecting to a control by means of the control unit.

As a low NOx technique for a direct gasoline injection engine in which a lean burn area is expanded by supercharger such as a turbo or the like, a combination with a compression ignition engine can be considered. That is, it corresponds to a technique in which a self ignition combustion is executed in an area having an increased air amount due to the supercharging for reducing the NOx discharge amount, whereby an amount of adsorption to the NOx catalyst is reduced. Since the self ignition is easily generated by making an interior side of the combustion chamber high temperature and high pressure, it is comparatively easy to make a condition for self igniting in the supercharging area. However, since a spark ignition combustion is executed by the ignition plug immediately before giving way to the self ignition combustion, a control at a time of switching the combustion is required. For example, JP-A-11-336600 describes a switching operation from the spark ignition combustion to the self ignition combustion by the ignition plug. In particular, there is described a switching means for switching the combustion mode in correspondence to the NOx sensor output, and a matter of maintaining the ignition timing during the self ignition combustion in the same value as the set value during the spark ignition combustion.

However, since the self ignition combustion rapidly generates the heat, an ideal ignition timing is expected to be set to a phase lag side for the purpose of actually maintaining the same torque. In the case of keeping to set the ignition timing to the same as that at the spark ignition combustion time, there is a possibility that the combustion within the self ignition combustion area becomes the ignition combustion performed by the ignition plug, that is, the combustion accompanying with a flame propagation, so that not only the NOx discharge amount is increased, but also there is a possibility that the knocking is generated so as to break the engine.

Figure 2:
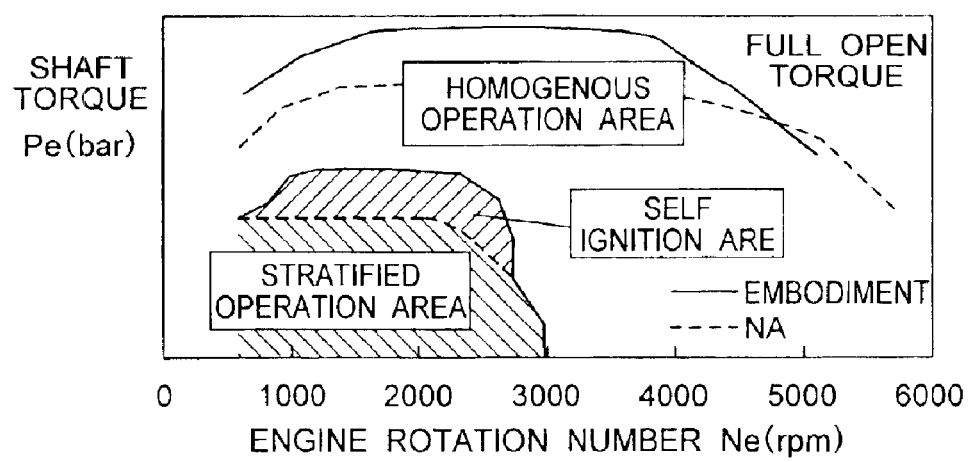
FIG. 2 is a schematic view which shows an operation area map for determining a combustion mode.

FIG. 2 shows an operation area map for determining a combustion mode of the engine 1. A vertical axis in FIG. 2 shows a shaft torque, which may be a torque measured from a crank shaft of the engine 1 or may be a required shaft torque computed on the basis of an amount of operating an accelerator pedal by a driver. The following description will be given on the assumption of the required shaft torque in the absence of a particular description. The engine 1 previously stores the operation area map as shown in FIG. 2 within the control unit, and the fuel injection timing and the ignition timing are controlled so as to execute a combustion aspect of an operating point which is determined on the basis of the engine rotation number and the required shaft torque. A natural intake (denoted by NA in the drawing) engine which corresponds to a base of the present invention has a lean burn area (described by a stratified operation area in the drawing) which is advantageous for improving a specific fuel consumption, and a homogenous operation area, and the operation is basically executed in accordance with the lean burn as far as an adverse effect is not given to an acceleration performance of the vehicle if an engine water temperature is equal to or more than a predetermined value. Lines shown by dotted lines in the drawing respectively correspond to torque limit lines of the stratified operation area and the homogenous operation area, and show areas in which the throttle valve 3 is fully opened. In the natural intake engine, since the intake air amount is limited by the air amount by which the throttle valve 3 is fully opened, as mentioned above, the area in which the lean burn can be executed is limited to an area in which the engine torque is comparatively low.

In order to expand the lean burn area which is advantageous for the specific fuel consumption, the engine 1 in accordance with the present invention is provided with the turbocharger. As a result, when the throttle valve 3 is fully opened, torque characteristics of the stratified operation area and the homogenous operation area respectively become as shown by solid lines. A point of the present invention is operating the stratified operation area which is expanded by the supercharging in accordance with the self ignition combustion, and in particular providing the self ignition area in the area in which the supercharging pressure becomes equal to or more than the atmospheric pressure.

A condition for executing the natural ignition combustion is making the interior side of the combustion chamber 22 high pressure and high temperature. Accordingly, it is effective to set a compression ratio high and introduce the EGR. By making the compression ratio high, it is possible to make a temperature and a pressure of air-fuel mixture within the combustion chamber 22 after compressing the piston high. However, in the case of the system in which the self ignition combustion and the spark ignition combustion are combined, there is a risk that the knocking is generated at the spark ignition combustion time by setting the compression ratio high, so that the compression ratio can not be blindly set to be high. Accordingly, the compression ratio of the direct gasoline injection engine is generally set to about 10 to 12.

As another method of making the temperature and the pressure of the air-fuel mixture high, there can be considered a method of increasing the intake air amount. The volumetric capacity of the combustion chamber 22 is maximum at a time when the piston is at a bottom dead center, no air amount over that can not be sucked in the natural intake engine, however, in the case that the turbocharger is provided, it is possible to suck a large amount of air, and the pressure before compressing the piston becomes equal to or more than the atmospheric pressure. As a result, it is possible to make the temperature and the pressure of the air-fuel mixture within the combustion chamber 22 after compressing the piston. Further, an inert gas such as a carbon dioxide which is generated in accordance with the combustion or the like or an active gas made radical is contained in the EGR gas, and such a gas has an effect of inhibiting or promoting the ignition of the air-fuel mixture becoming high temperature and high pressure. Accordingly, the EGR gas amount can be utilized for controlling the ignition timing.

Figure 3:
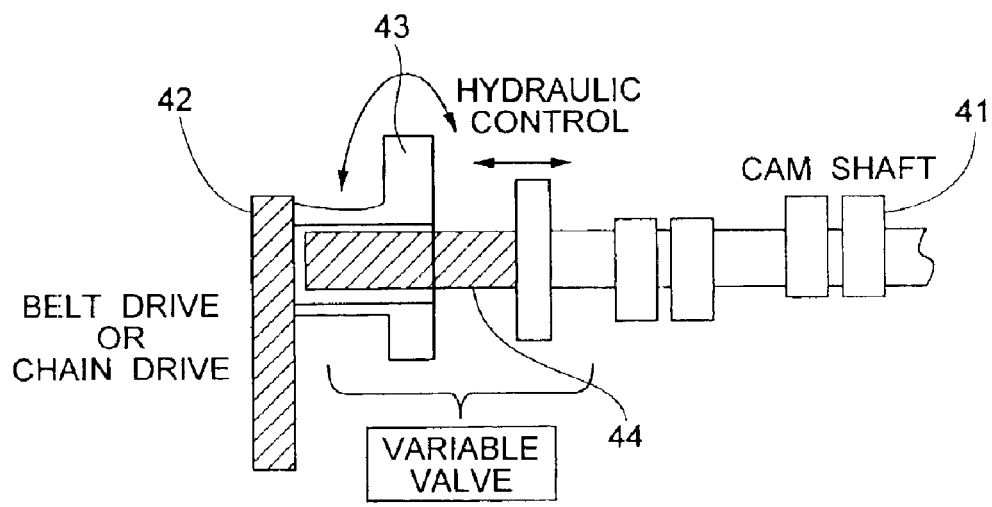
FIG. 3 is a schematic view which shows one embodiment of a phase type variable valve mechanism.

The changeable mechanisms 7 and 8 for the intake valve 13 and the exhaust valve 14 are employed for controlling the EGR gas amount. One embodiment of the changeable mechanism will be shown in FIG. 3. A variable valve mechanism 44 is provided between a cam shaft 41 and a cam sprocket 43 connecting a timing belt 42, and rotation phases of the cam shaft 41 and the timing belt 42 are shifted, for example, by moving a screw portion of the variable valve mechanism 44 in accordance with a hydraulic control or the like. Further, it is possible to employ a method of rotating the cam sprocket 43 by a motor so as to shift the phases of the cam shaft 41 and the timing belt 42.

Figure 4:
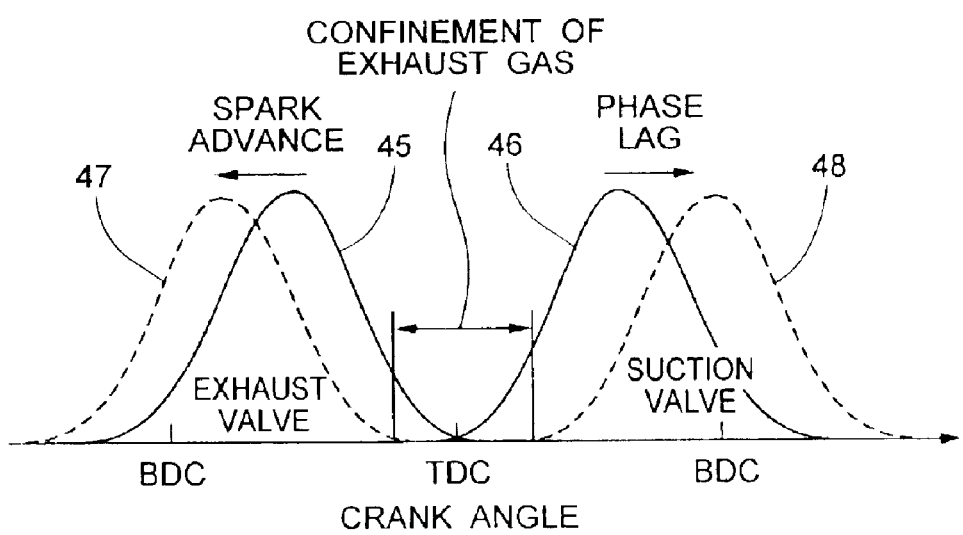
FIG. 4 is a schematic view which shows lift curves of an intake valve and an exhaust valve.

FIG. 4 shows one embodiment of a method of controlling the intake valve and the exhaust valve by means of the changeable mechanism mentioned above. A lift curve of the exhaust valve is denoted by reference numeral 45, and the exhaust valve is structured such as to be closed at a timing a little over the top dead center (denoted by reference symbol TDC in the drawing). A lift curve of the intake valve is denoted by reference numeral 46, and the intake valve is structured such as to be opened at a timing a little before the top dead center (denoted by reference symbol TDC in the drawing). In this combination of the lift curves, there exists a period for which both of the intake valve and the exhaust valve are a little opened, near the top dead center. The period is called as an overlap period. When the overlap period is great, the exhaust gas which is temporarily discharged to the exhaust passage is flowed backward to e combustion chamber. The EGR gas can be introduced into the combustion chamber by utilizing this phenomenon. Further, in the case of spark advancing the lift curve of the exhaust valve as shown by reference numeral 47 and phase lagging the lift curve 48 of the intake valve as shown by reference numeral 48, the exhaust valve is closed during the exhaust stroke, so that the exhaust gas is confined in the combustion chamber without being completely discharged. The EGR gas may be introduced into the combustion chamber by utilizing this phenomenon. The EGR gas introduced into the combustion chamber is utilized for the combustion control in the next cycle.

Figure 5:
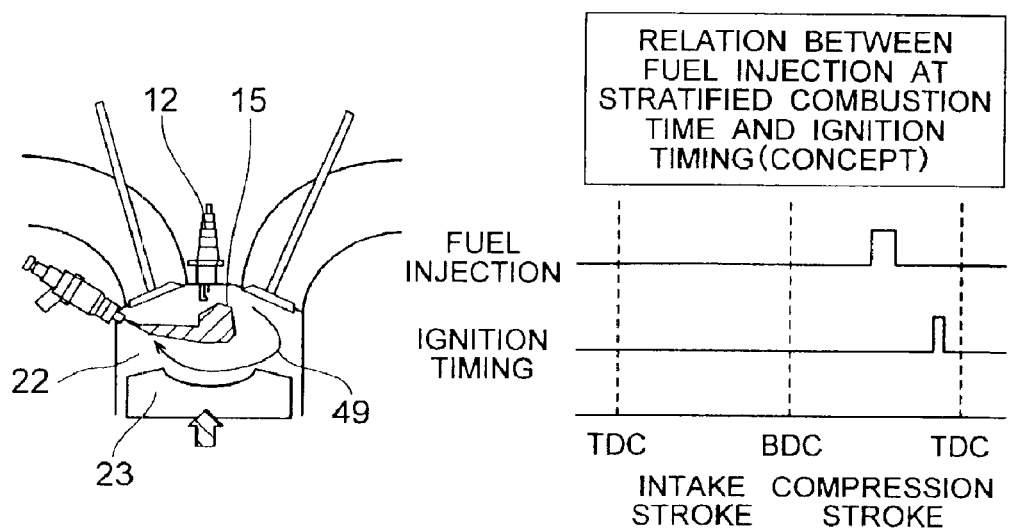
FIG. 5 is a schematic view of an inner side of a combustion chamber at a time of stratified combustion and a conceptual diagram which shows a relation between a fuel injection and an ignition timing.

FIG. 5 shows a relation between the fuel injection and the ignition timing at a time of the stratified combustion. In the stratified combustion mode, the fuel 15 is concentrated near a gap of the ignition plug 12 while being vaporized, on the basis of functions of an air flow 49 which is generated within the combustion chamber 22 by injecting the fuel 15 during the compression stroke, a cavity which is formed on a top surface of the piston 23, and the like. As a result, even in the lean air-fuel mixture which is viewed as a whole, the air-fuel ratio in the periphery of the ignition plug gap becomes about 10 to 15 by which the ignition and combustion is easily performed. A relation between the fuel injection timing and the ignition timing will be conceptually shown by a chart in a right side of FIG. 5.

Figure 6:
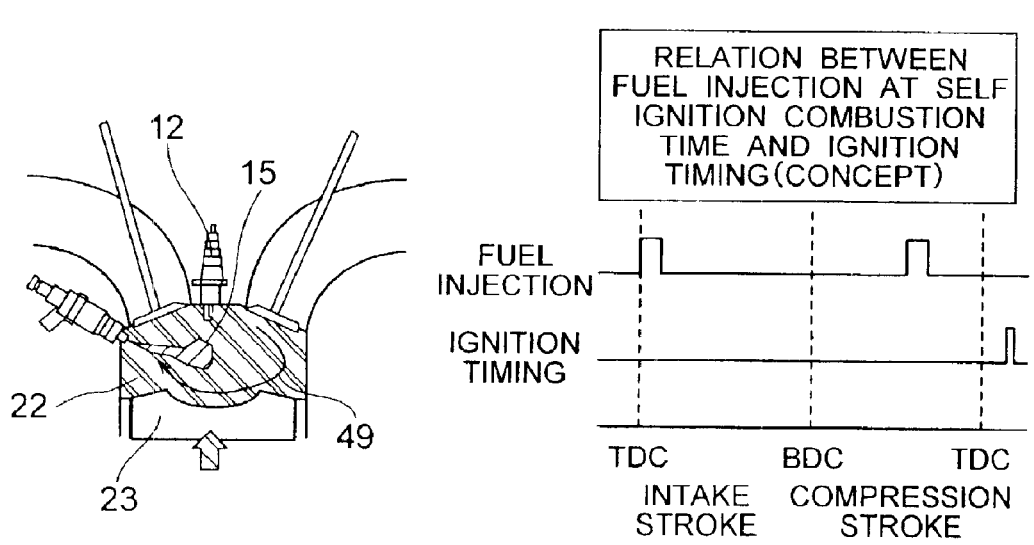
FIG. 6 is a schematic view of the inner side of the combustion chamber at a time of self ignition combustion and a conceptual diagram which shows a relation between a fuel injection and an ignition timing.

On the contrary, a relation between the fuel injection and the ignition timing at a time of the self ignition combustion is shown in FIG. 6. When the condition for executing the self ignition combustion is prepared, the combustion mode is changed from the stratified combustion mode shown in FIG. 5 to the self ignition combustion mode shown in FIG. 6. In the self ignition combustion, in order first to form the homogenous air-fuel mixture, the injection is separated into a plurality of times (at least twice), so that the injection at a first time is executed in the initial stage of the suction stroke, and the injection at a second time is executed in the last half of the compression stroke. The fuel injected in the initial stage of the suction stroke is diffused into a whole within the combustion chamber 22, and is formed in the homogenous air-fuel mixture while being mixed with the air or being mixed with the air and the EGR gas in the case that the EGR gas mentioned above is introduced. The homogenous air-fuel mixture is increased in the temperature and the pressure in accordance with the piston compression, and runs into the ignition because of an active radical reaction which is required for the self ignition combustion. When the amount of fuel which is injected in the suction stroke is more, the radical reaction is early generated and the ignition timing becomes early. The ignition timing can be controlled on the basis of the EGR gas amount mentioned above, and can be also controlled on the basis of the radical reaction amount, that is, the fuel injection amount at the first time. Accordingly, the fuel injection amount at the first time is adjusted and the radical reaction amount is inhibited, and then the injection at the second time is executed near the top dead center. The radical reaction becomes again active by the fuel which is injected at the second time and runs to the ignition.

Figure 7:
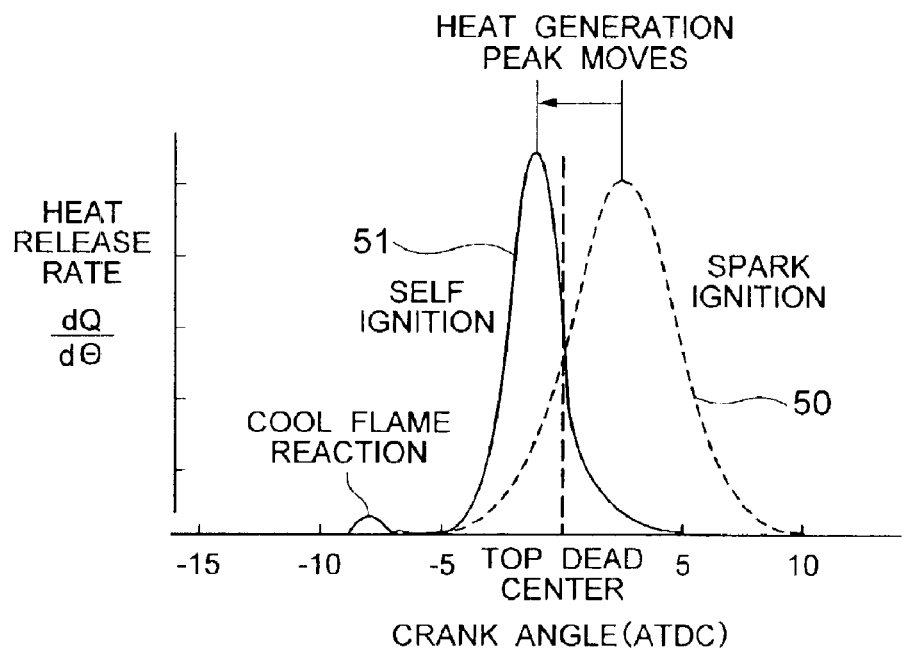
FIG. 7 is a schematic view which describes a heat generation rate in a spark ignition combustion and a self ignition combustion.

FIG. 7 shows heat release rates at the spark ignition combustion time and the self ignition combustion time. The heat release rate is obtained by applying a waveform analysis to the pressure change within the combustion chamber 22. This schematic view is based on an experimental data, however, is described in a simplified manner for convenience of explanation. The ignition timing at the spark ignition combustion time is set to 5 degrees before the top dead center (−5 (ATDC) in the drawing), and the heat generation is comparatively slowly started after the ignition as shown by a broken line 50. A peak position of the heat release rate exists after the top dead center, the heat release rate is slowly reduced thereafter, and the combustion is finished. The ignition timing at the self ignition combustion time can be controlled on the basis of the EGR gas amount and the injection timing as mentioned above. In the case of setting the ignition timing to 5 degrees before the top dead center (−5 (ATDC) in the drawing), a slight change is seen in the heat release rate before the ignition as shown in a solid line 51. This is called as a cool flame reaction, and expresses that the radical reaction becomes active. Since a lot of apparent ignition points exist in the self ignition combustion, a combustion speed at an early stage after the ignition is higher than a combustion speed at the spark ignition timing, and the peak position of the heat release rate becomes before the top dead center. Since the matter that the peak position of the heat release rate comes to before the top dead center means that the piston performs the compression motion against the pressure increase generated by the combustion, an efficiency of converting the energy generated by the combustion into a mechanical work is reduced. It is ideal that the peak position of the heat release rate is set to the position slightly lagged from the top dead center. Accordingly, at a time of being changed from the stratified combustion to the self ignition combustion, it is necessary to set to the ignition timing which is suitable for the self ignition combustion.

Figure 8:
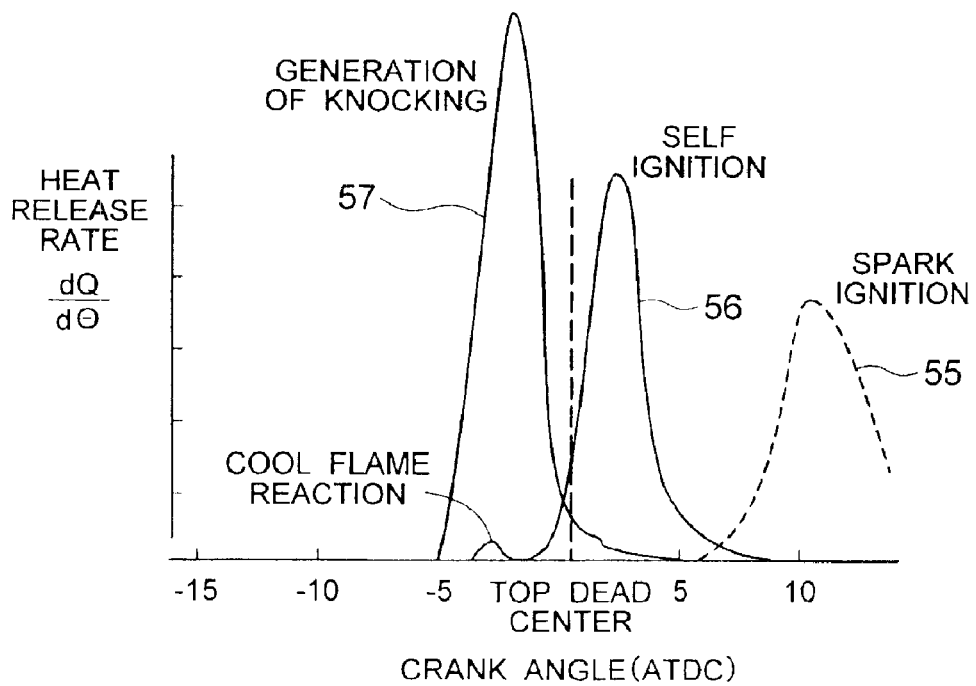
FIG. 8 is a schematic view which describes the heat generation rate in the spark ignition combustion and the self ignition combustion.

FIG. 8 shows a heat release rate of the self ignition combustion at a time of making the ignition timing proper. The ignition timing is phase lagged from the state shown in FIG. 7 so that the peak position of the heat release rate 56 becomes after the top dead center. If the ignition timing is still set to the ignition timing at the stratified combustion time at a time of being changed from the stratified combustion to the self ignition combustion, the combustion starts on the basis of the spark ignition before the cool frame reaction occurs as shown in the heat release rate 57, and the knocking is generated. Since the self ignition combustion has the high combustion speed, the ignition timing is lagged from the ignition timing at the spark ignition combustion time in order to obtain a suitable combustion. Accordingly, in order to smoothly give way to the self ignition combustion, it is necessary to lag the ignition timing rather than the ignition timing of the self ignition combustion.

Figure 9:
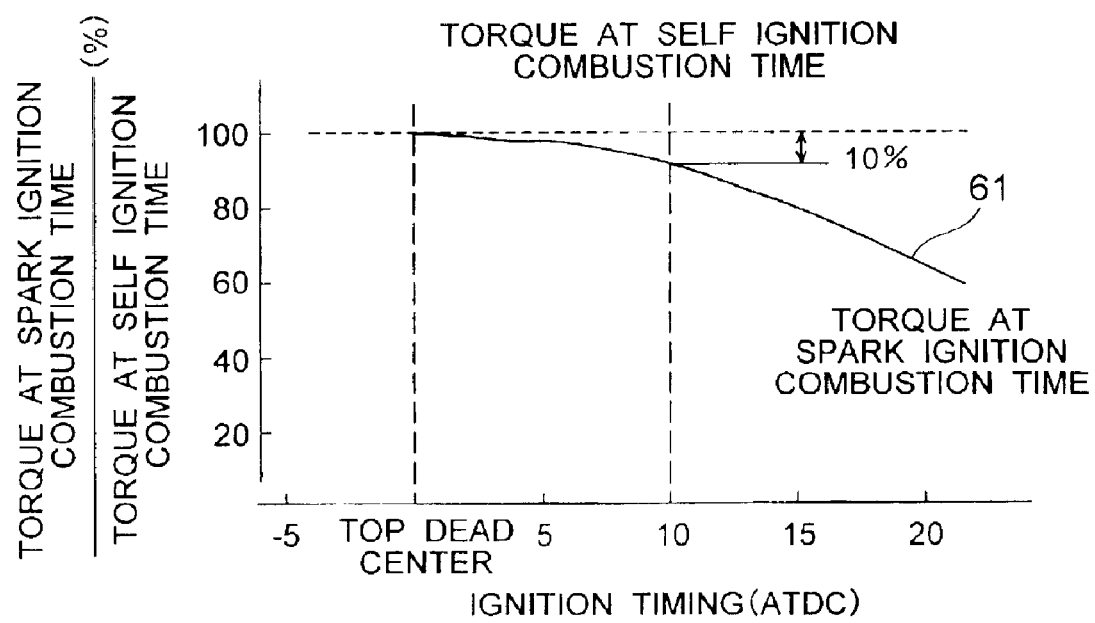
FIG. 9 is a schematic view which describes a torque difference between the spark ignition combustion and the self ignition combustion.

After giving way to the self ignition combustion, the ignition timing is changed from the set value at the spark ignition combustion time to after the top dead center. In FIG. 8, there is shown an embodiment in which the ignition timing is set to 5 degrees after the top dead center (5 (ATDC) in the drawing). The ignition operation is continued after giving way to the self ignition combustion because of preventing the exhaust gas from being deteriorated due to the misfire. In the case of the misfire, an unburned fuel is discharged, however, it is possible to ignite and burn the misfired air-fuel mixture in accordance with the spark ignition by setting the ignition timing to after the top dead center. However, in this case, since the ignition timing is not set to the ignition timing suitable for the spark ignition combustion, a generation torque is lowered. When a difference between a torque in accordance with the normal self ignition combustion and a torque in accordance with the spark ignition combustion becomes large, a torque step is generated and gives a bad influence to an operation characteristic. This becomes significant in accordance that the ignition timing is lagged. FIG. 9 shows an experimental data. On the assumption that the generation torque at the normal self ignition combustion time is 100, the generation torque at the spark ignition combustion time is lowered in accordance that the ignition timing is lagged rather than the top dead center. It is known from the experimental result that a torque reduction of 10% is an allowable range, and it is necessary to set the ignition timing to a range between the top dead center and 10 degrees after the top dead center (10 (ATDC) in the drawing). A relation between the fuel injection timing at the self ignition combustion time and the ignition timing is conceptually shown by a chart in a right side of FIG. 6.

The mode is changed from the stratified combustion mode to the self ignition combustion mode after the turbocharger starts working and the intake pressure becomes equal to or more than the atmospheric pressure, as shown in FIG. 2. As a method of detecting whether or not the stratified combustion mode gives way to the self ignition combustion mode, there is a method of judging on the basis of the change of the heat release rate which can be obtained by analyzing the pressure waveform within the combustion chamber 22 as shown in FIG. 7. In this method, it is possible to judge the knocking, the misfire and the like on the basis of the pattern of the heat release rate. Further, as another method which employs outputs from the exhaust gas temperature sensor and the NOx concentration sensor attached to the exhaust pipe, there is a method of judging that the stratified combustion mode gives way to the self ignition combustion mode in the case that the outputs are over predetermined values. When the mode is changed from the stratified combustion mode to the self ignition combustion mode, the exhaust temperature is lowered, and the NOx concentration in the exhaust gas is extremely reduced. The self ignition judging means judges giving way to the self ignition combustion mode in correspondence to the output signals.

Figure 10:
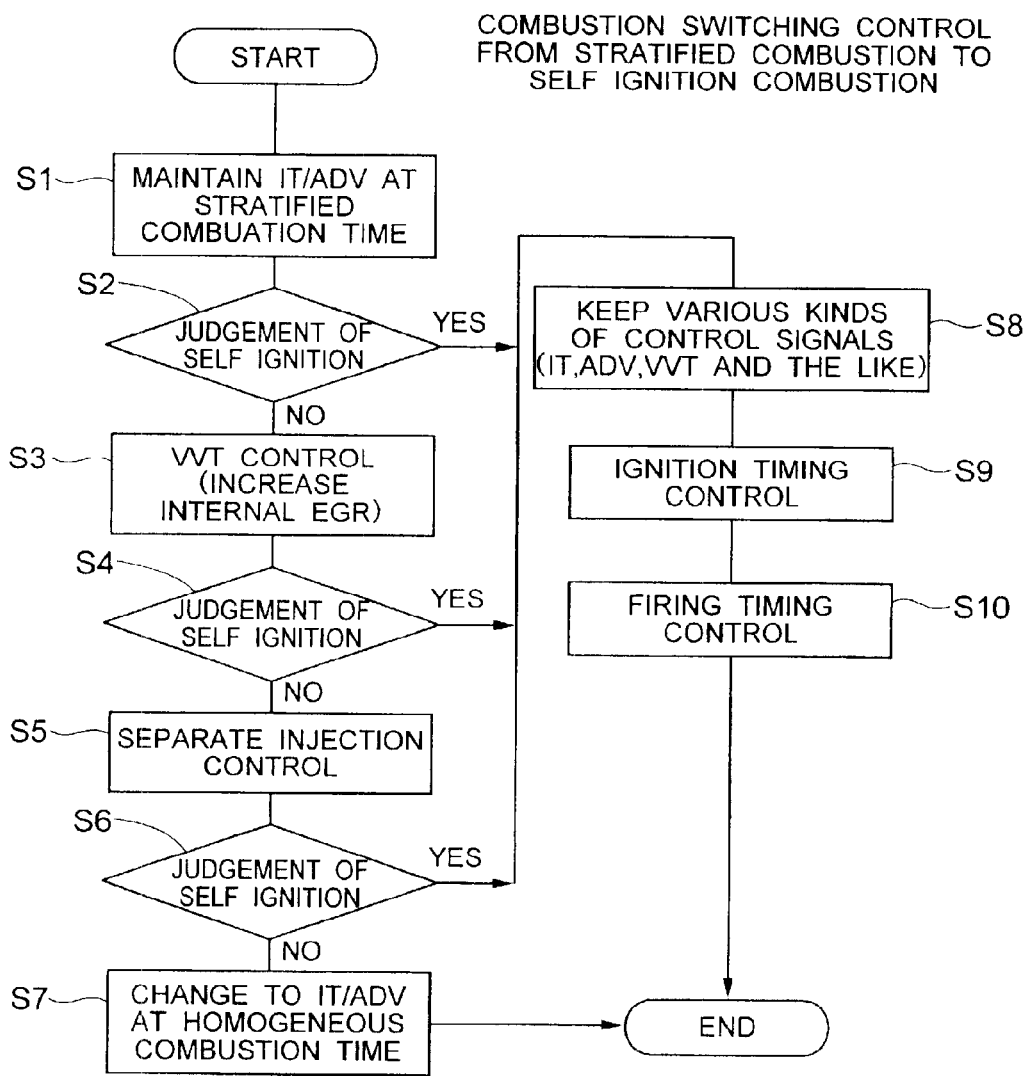
FIG. 10 is a flow chart of a combustion switching control from the stratified combustion to the self ignition combustion.

A flow chart of a combustion switching control from the stratified combustion mode to the self ignition combustion mode is shown in FIG. 10. The combustion switching control is started at a time when the condition for the self ignition combustion such as the intake pressure, the intake temperature, the variable valve mechanism set value or the like is established. At first, in a step 1 (in the drawing, the step is denoted by reference symbol S), the fuel injection timing and the ignition timing at the stratified combustion time before the combustion is switched are maintained. In a step 2, the self ignition judging means mentioned above judges on the basis of the output signals from the exhaust temperature sensor and the NOx sensor whether or not the self ignition combustion is generated. In the case that the self ignition combustion is started, the step goes to a step 8, and in the case that it is not started, the step goes to a step 3. In the step 3, the set value of the variable valve mechanism is changed so that the internal EGR amount is increased so as to make a state in which the self ignition combustion is easily generated. The radical reaction becomes active by the internal EGR gas, and the state in which the self ignition combustion is easily generated is made. In the case that the self ignition combustion is started in a step 4, the step goes to the step 8, and in the case that it is not started, the step goes to a step 5. In the step 5, in order to make a state in which the self ignition combustion is further easily generated, a separation injection control is started. In the separation injection control, the fuel injection is separated into two or more times at the lowest. In the case that the self ignition combustion is started in a step 6, the step goes to the step 8, and in the case that it is not started, the step goes to a step 7. In the step 7, the change to the self ignition combustion is given up, and the setting is changed to the setting of the fuel injection timing and the ignition timing at the homogenous combustion time, whereby the combustion switching control is finished.

In the case that the self ignition combustion is started in each of the steps 2, 4 and 6, the various kinds of control signals of the fuel injection timing, the ignition timing, the variable valve and the like are kept in the step 8, and the ignition timing control of lagging the ignition timing to after the top dead center is executed in a step 9. In a step 10, the ignition timing control is executed so that the self ignition combustion is continued even when the intake pressure, the intake temperature, the internal EGR amount and the like are changed, whereby the combustion switching control is finished.

As described above, in accordance with the control method of the internal combustion engine of the present invention, it is possible to prevent the NOx discharge amount from being increased while improving the specific fuel consumption on the basis of the expansion of the lean burn area. The number of the rich spike control is reduce due to the reduction of the NOx discharge amount, and the specific fuel consumption is further improved. Further, the knocking can be prevented by setting the ignition timing within the predetermined range after the top dead center at a time of giving way to the self ignition combustion mode, it is possible to prevent the unburned gas from being discharged due to the misfire, and it is possible to reduce the torque step.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method of controlling a direct gasoline injection type internal combustion engine provided with a turbocharger in which a combustion mode is switched to a stratified combustion mode or a self ignition combustion mode in correspondence to a suction pressure of the engine, comprising the steps of:

setting an ignition timing to a range between a top dead center and 10 degrees after the top dead center (0 to 10 (ATDC)) at a time of operating an engine in accordance with a self ignition combustion mode.

2. A method of controlling a direct gasoline injection engine, said direct gasoline injection engine comprising:
a fuel injection valve which is capable of directly injecting a fuel into a combustion chamber of the engine;
an intake valve and an exhaust valve which are combined with the combustion chamber of the engine;
a variable valve mechanism which makes a phase of said intake valve or said exhaust valve variable;
a turbine which is placed in an exhaust passage of said engine and is turned by an exhaust gas;
a compressor which is placed in an intake passage of said engine and is turned by a rotary force of said turbine;
a catalyst which is disposed in a downstream side of said turbine;
a bypass passage which bypasses said turbine; and
a control valve which is capable of adjusting an exhaust gas flow amount to said bypass passage,
wherein an ignition timing is set to a predetermined value after a top dead center at a time of operating said engine in accordance with a self ignition combustion mode.

3. A method of controlling a direct gasoline injection engine, said direct gasoline injection engine comprising:
a fuel injection valve which is capable of directly injecting a fuel into a combustion chamber of the engine;
an intake valve and an exhaust valve which are combined with the combustion chamber of the engine;
a variable valve mechanism which makes a phase of said intake valve or said exhaust valve variable;
a turbine which is placed in an exhaust passage of said engine and is turned by an exhaust gas;
a compressor which is placed in an intake passage of said engine and is turned by a rotary force of said turbine;
a catalyst which is disposed in a downstream side of said turbine;
a bypass passage which bypasses said turbine;
a control valve which is capable of adjusting an exhaust gas flow amount to said bypass passage; and
a self ignition judging means which detects a change to the self ignition combustion mode,
wherein an ignition timing is set to a predetermined value after a top dead center on the basis of a result of judgement by said self ignition judging means.

4. A method of controlling a direct gasoline injection engine s claimed in claim 2, wherein said ignition timing is within a range between the top dead center and 10 degrees after the top dead center (1 to 10 (ATDC)).

5. A method of controlling a direct gasoline injection engine s claimed in claim 3, wherein said ignition timing is within a range between the top dead center and 10 degrees after the top dead center (1 to 10 (ATDC)).

6. A method of controlling a direct gasoline injection type internal combustion engine provided with a turbocharger in which a combustion mode is switched to a stratified combustion mode or a self ignition combustion mode in correspondence to a suction pressure of the engine, comprising:
setting a combustion mode to a stratified combustion mode at a time when a suction pressure of an engine is equal to or less than an atmospheric pressure; and
switching the combustion mode to a self ignition combustion mode at a time when the suction pressure of the engine is equal to or more than the atmospheric pressure,
wherein an ignition timing is set to a predetermined value after a top dead center at a time of operating said engine in accordance with a self ignition combustion mode.

7. A direct gasoline injection type internal combustion engine provided with a turbocharger comprising:

a fuel injection valve which directly supplies a fuel into a combustion chamber of the engine;

an ignition plug which supplies an ignition spark within the combustion chamber;

a turbine which is provided in an exhaust passage of the engine;

a supercharger which is driven by said turbine and compresses an air passing through an intake passage; and a control apparatus which switches a combustion mode from a plug ignition to a self ignition when the pressure of the intake air supercharged by said supercharger is equal to or exceeds the atmospheric pressure.

8. A method of controlling a direct gasoline injection engine, said direct gasoline engine comprising:

a fuel injection valve which is capable of directly injecting a fuel into a combustion chamber of the engine;

an intake valve and an exhaust valve which are combined with the combustion chamber of the engine;

a variable valve mechanism which makes a phase of said intake valve or said exhaust valve variable;

a turbine which is placed in an exhaust passage of said engine and is turned by an exhaust gas;

a compressor which is placed in an intake passage of said engine and is turned by a rotary force of said turbine;

a catalyst which is disposed in a downstream side of said turbine;

a bypass passage which bypasses said turbine; and a control valve which is capable of adjusting an exhaust gas flow amount to said bypass passage, wherein a combustion mode is switched from a plug ignition combustion mode to a self ignition combustion mode when the intake air pressure is equal to or exceeds an atmospheric pressure in the stratified operation area which said supercharger expands by supercharging the intake air.

* * * * *